United States Patent
Tanabe et al.

(10) Patent No.: US 10,394,335 B2
(45) Date of Patent: Aug. 27, 2019

(54) ELECTRONIC DEVICE, RECORDING MEDIUM, AND CONTROL METHOD

(71) Applicant: KYOCERA Corporation, Kyoto (JP)

(72) Inventors: Shigeki Tanabe, Yokohama (JP); Hideki Morita, Yokohama (JP); Isao Masuike, Machida (JP); Shinya Saito, Kawasaki (JP); Yasushi Kitamura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/709,603

(22) Filed: Sep. 20, 2017

(65) Prior Publication Data

US 2018/0081449 A1 Mar. 22, 2018

(30) Foreign Application Priority Data

Sep. 21, 2016 (JP) .................................. 2016-184331

(51) Int. Cl.
*G06F 3/01* (2006.01)
*G06F 3/147* (2006.01)
(Continued)

(52) U.S. Cl.
CPC .............. *G06F 3/017* (2013.01); *G06F 1/163* (2013.01); *G06F 1/1694* (2013.01); *G06F 3/147* (2013.01);
(Continued)

(58) Field of Classification Search
CPC ........ G06F 3/017; G06F 1/163; G06F 1/1694; G06F 3/147; G09B 19/003
See application file for complete search history.

(56) References Cited

U.S. PATENT DOCUMENTS 7,610,013 B2 10/2009 Sutardja
2006/0232704 A1 10/2006 Sutardja
(Continued)

FOREIGN PATENT DOCUMENTS

JP 2006-340339 A 12/2006
JP 2012-053074 A 3/2012
(Continued)

OTHER PUBLICATIONS

An Office Action; "Notice of Reasons for Rejection," mailed by the Japanese Patent Office dated Jan. 17, 2017, which corresponds to Japanese Patent Application No. 2016-184331 and is related to the present application; with English language Concise Explanation.
(Continued)

*Primary Examiner* — Lixi C Simpson
(74) *Attorney, Agent, or Firm* — Studebaker & Brackett PC (57) ABSTRACT

An electronic device includes a communication interface, a display, and a controller. The communication interface communicates with a movement detection apparatus including a motion sensor that detects a predetermined movement of a user. The controller activates the motion sensor when a screen displayed on the display is related to the predetermined movement. The predetermined movement includes a plurality of motions, the motion sensor includes a plurality of sensors that detect the plurality of motions, and when the screen displayed on the display is related to one motion among the plurality of motions, the controller activates the sensor that detects the one motion.

6 Claims, 8 Drawing Sheets

(51) Int. Cl.
*G09B 5/02* (2006.01)
*G09B 19/00* (2006.01)
*G06F 1/16* (2006.01)
*G01C 19/56* (2012.01)
*G01L 9/00* (2006.01)
*G01P 15/18* (2013.01)

(52) U.S. Cl.
CPC .............. *G09B 5/02* (2013.01); *G09B 19/003* (2013.01); *G09B 19/0092* (2013.01); *G01C 19/56* (2013.01); *G01L 9/00* (2013.01); *G01P 15/18* (2013.01)

(56) References Cited

U.S. PATENT DOCUMENTS

| | | | |
|---|---|---|---|
| 2011/0090407 A1* | 4/2011 | Friedman | H04N 21/42204 348/734 |
| 2012/0144076 A1* | 6/2012 | Yang | G06F 3/0346 710/63 |
| 2012/0310717 A1* | 12/2012 | Kankainen | G06Q 30/02 705/14.4 |
| 2014/0135960 A1* | 5/2014 | Choi | A61B 5/0205 700/91 |
| 2015/0346831 A1 | 12/2015 | Nii | |
| 2017/0322639 A1* | 11/2017 | Ida | G06F 3/0487 |
| 2018/0329501 A1* | 11/2018 | Marchenko | G06T 7/215 |

FOREIGN PATENT DOCUMENTS

| | | |
|---|---|---|
| JP | 2013-027629 A | 2/2013 |
| JP | 2015-211332 A | 11/2015 |
| JP | 2015-225493 A | 12/2015 |

OTHER PUBLICATIONS

An Office Action; "Notice of Reasons for Rejection," mailed by the Japanese Patent Office dated Jun. 27, 2017, which corresponds to Japanese Patent Application No. 2017-053583 and is related to the present application; with English language Concise Explanation.

* cited by examiner

ELECTRONIC DEVICE, RECORDING MEDIUM, AND CONTROL METHOD

CROSS-REFERENCE TO RELATED APPLICATION

This application claims priority to and the benefit of Japanese Patent Application No. 2016-184331 filed Sep. 21, 2016, the entire contents of which are incorporated herein by reference.

TECHNICAL FIELD

This disclosure relates to an electronic device, a recording medium, and a control method.

BACKGROUND

An electronic device that, for example, uses an infrared sensor to detect a gesture and then processes an input operation corresponding to the gesture has been proposed in recent years.

SUMMARY

An electronic device according to one embodiment of this disclosure includes a communication interface configured to communicate with a movement detection apparatus including a motion sensor, the motion sensor being configured to detect a predetermined movement of a user; a display; and a controller configured to activate the motion sensor when a screen displayed on the display is related to the predetermined movement.

An electronic device according to one embodiment of this disclosure includes a communication interface configured to communicate with a movement detection apparatus including a motion sensor, the motion sensor being configured to detect a predetermined movement of a user; a display; and a controller configured to update a screen displayed on the display when the motion sensor detects a start or an end of the predetermined movement.

A non-transitory computer-readable recording medium according to one embodiment of this disclosure includes computer program instructions to be executed by an electronic device including a display and a communication interface configured to communicate with a movement detection apparatus including a motion sensor, the motion sensor being configured to detect a predetermined movement of a user, the instructions causing the electronic device to activate the motion sensor when a screen displayed on the display is related to the predetermined movement.

A non-transitory computer-readable recording medium according to one embodiment of this disclosure includes computer program instructions to be executed by an electronic device including a display and a communication interface configured to communicate with a movement detection apparatus including a motion sensor, the motion sensor being configured to detect a predetermined movement of a user, the instructions causing the electronic device to update a screen displayed on the display when the motion sensor detects a start or an end of the predetermined movement.

A control method according to one embodiment of this disclosure is a control method of an electronic device including a display and a communication interface configured to communicate with a movement detection apparatus including a motion sensor, the motion sensor being configured to detect a predetermined movement of a user, the control method including activating the motion sensor when a screen displayed on the display is related to the predetermined movement.

A control method according to one embodiment of this disclosure is a control method of an electronic device including a display and a communication interface configured to communicate with a movement detection apparatus including a motion sensor, the motion sensor being configured to detect a predetermined movement of a user, the control method including updating a screen displayed on the display when the motion sensor detects a start or an end of the predetermined movement.

The electronic device according to one of the embodiments of this disclosure is more convenient.

DETAILED DESCRIPTION

Embodiment 1

(Configuration of Electronic Device)

Figure 1:
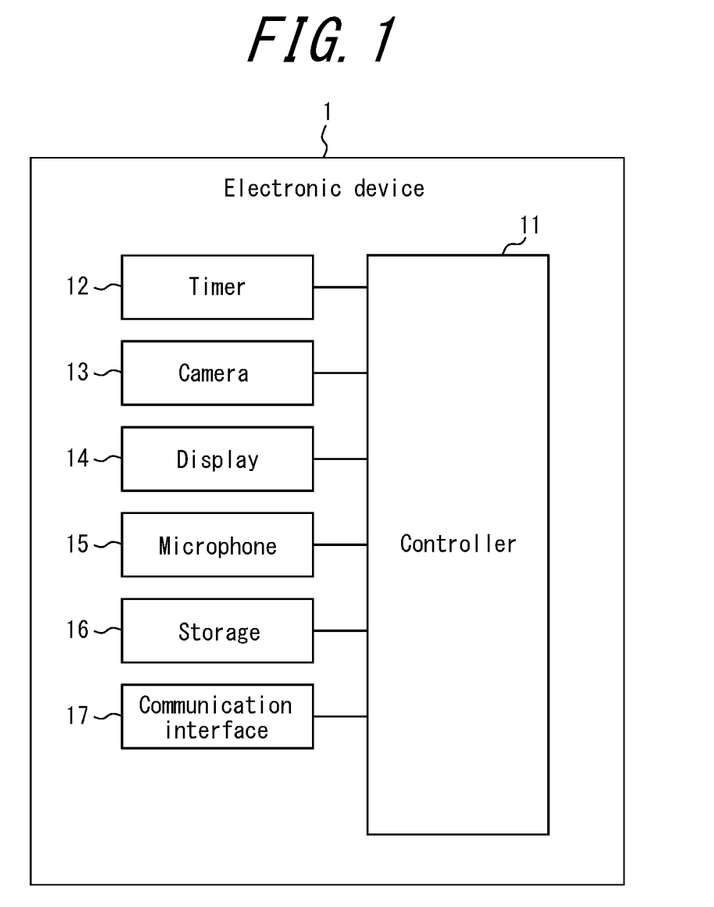
FIG. 1 is a configuration diagram of an electronic device according to one embodiment.

The electronic device 1 according to one embodiment illustrated in FIG. 1 includes a display 14, a storage 16, a communication interface 17, and a controller 11. The electronic device 1 further includes a timer 12, a camera 13, and a microphone 15. FIG. 1 is only an example, and the electronic device 1 need not include every component in FIG. 1. Also, the electronic device 1 may include components other than those illustrated in FIG. 1. For example, the electronic device 1 may include a UV sensor capable of measuring the amount of ultraviolet light included in sunlight or other light. The electronic device 1 may, for example, also include an illumination sensor that detects the intensity of surrounding light.

The display 14 displays a screen. The screen includes, for example, at least one of characters, images, symbols, graphics, and the like. The display 14 may be a liquid crystal display, an organic electro-luminescence panel, an inorganic electro-luminescence panel, or the like. In this embodiment, the display 14 is integrated with a touchscreen to constitute a touch panel. The touchscreen detects contact by a finger, a stylus, or other object and identifies the contact position. The touchscreen integrated with the display 14 can simultaneously detect a plurality of positions contacted by fingers, styluses, or other objects.

The storage 16 functions as a memory storing programs and data. The storage 16 temporarily stores the processing result of the controller 11. The storage 16 may include any storage device, such as a semiconductor storage device or a magnetic storage device. The storage 16 may also include a plurality of types of storage devices. The storage 16 may include a combination of a portable storage medium, such as a memory card, and an apparatus for reading the storage medium.

The programs stored in the storage 16 include applications that run in the foreground or the background and a control program that supports operations of the applications. For example, the applications cause the controller 11 to execute processing to display predetermined information on the display 14. The control program may, for example, be an operating system (OS). The applications and control program may be installed on the storage 16 by communication with the communication interface 17 or from a storage medium.

The communication interface 17 is for communicating over a wired or wireless connection. The communication method of the communication interface 17 in one embodiment is prescribed by a wireless communication standard. For example, a cellular phone communication standard such as 2G, 3G, or 4G may be used as the wireless communication standard. Examples of cellular phone communication standards include long term evolution (LTE), wideband code division multiple access (W-CDMA), CDMA2000, personal digital cellular (PDC), global system for mobile communications (GSM® (GSM is a registered trademark in Japan, other countries, or both)), and personal handy-phone system (PHS). Examples of wireless communication standards include worldwide interoperability for microwave access (WiMAX), IEEE802.11, Bluetooth® (Bluetooth is a registered trademark in Japan, other countries, or both), infrared data association (IrDA), and near field communication (NFC). The communication interface 17 may support one or more of the aforementioned communication standards. In this embodiment, the communication interface 17 communicates with the communication interface 37 of the movement detection apparatus 2 illustrated in FIG. 2 using Bluetooth®. The electronic device 1 pairs with the movement detection apparatus 2 at the start of communication to create a stable communication environment.

The controller 11 is a processor such as a central processing unit (CPU). The controller 11 may be a system-on-a-chip (SoC) or other type of integrated circuit in which other components are integrated. The controller 11 may be configured by combining a plurality of integrated circuits. The controller 11 implements a variety of functions by comprehensively controlling operations of the electronic device 1.

In greater detail, the controller 11 refers as necessary to data stored in the storage 16. The controller 11 implements a variety of functions by executing instructions included in programs stored in the storage 16 to control other functional components, such as the display 14.

As described below, the controller 11 controls the screen displayed on the display 14 in accordance with a user movement detected by the movement detection apparatus 2.

The timer 12 receives an instruction for a timer operation from the controller 11. Once a predetermined time has elapsed, the timer 12 outputs a signal indicating that the time has elapsed to the controller 11. The timer 12 may be provided external to the controller 11, as illustrated in FIG. 1, or may be included within the controller 11.

The camera 13 captures images of subjects around the electronic device 1. One example of the camera 13 is a front camera provided on the same face as the display 14 of the electronic device 1.

The microphone 15 detects sounds around the electronic device 1, including people's voices.

(Configuration of Movement Detection Apparatus)

Figure 2:
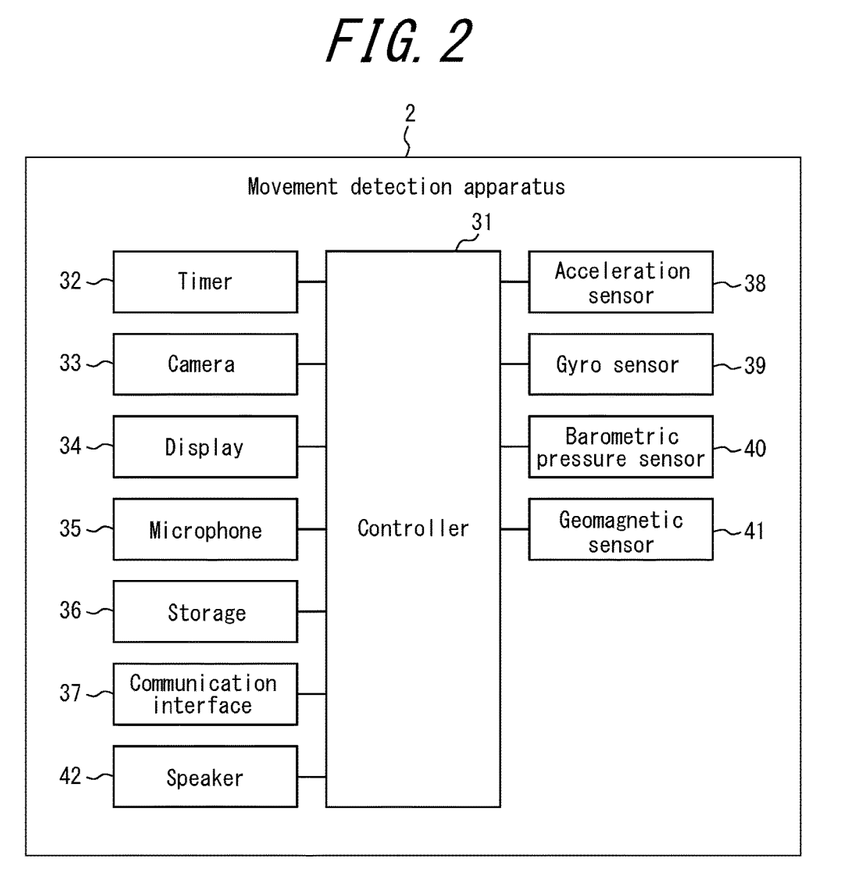
FIG. 2 is a configuration diagram of a movement detection apparatus that communicates with an electronic device.

The movement detection apparatus 2 illustrated in FIG. 2 communicates with the electronic device 1 and outputs data used to control the electronic device 1. The movement detection apparatus 2 is also a type of electronic device but is referred to by this name in this disclosure to distinguish it from the electronic device 1. The movement detection apparatus 2 includes a storage 36, a communication interface 37, an acceleration sensor 38, a gyro sensor 39, a barometric pressure sensor 40, and a controller 31. The movement detection apparatus 2 further includes a timer 32, a camera 33, a display 34, a microphone 35, a geomagnetic sensor 41, and a speaker 42. FIG. 2 is only an example, and the movement detection apparatus 2 need not include every component in FIG. 2. Also, the movement detection apparatus 2 may include components other than those illustrated in FIG. 2. In this embodiment, the motion sensor that detects the user's movements is configured by the acceleration sensor 38, the gyro sensor 39, and the barometric pressure sensor 40.

The storage 36 functions as a memory storing programs and data. The storage 36 temporarily stores the processing result of the controller 31. The storage 36 may include any storage device, such as a semiconductor storage device or a magnetic storage device. The storage 36 may also include a plurality of types of storage devices. The storage 36 may include a combination of a portable storage medium, such as a memory card, and an apparatus for reading the storage medium.

The programs stored in the storage 36 include applications that run in the foreground or the background and a control program that supports operations of the applications. For example, the applications cause the controller 31 to execute processing to display information from the electronic device 1 on the display 34. The control program is, for example, a battery management program that manages the remaining amount of a battery. The applications and control program may be installed on the storage 36 by communication with the communication interface 37 or from a storage medium.

The communication interface 37 is for communicating over a wired or wireless connection. The communication method of the communication interface 37 in one embodiment is prescribed by a wireless communication standard. The communication interface 37 may support one or more of the communication standards described with regard to the communication interface 17 of the electronic device 1. In this embodiment, the communication interface 37 communicates with the communication interface 17 of the electronic device 1 using Bluetooth®.

The acceleration sensor 38 detects the direction and magnitude of acceleration acting on the movement detection apparatus 2. The acceleration sensor 38 is a three-axis (3D) sensor that detects acceleration in the x-axis, y-axis, and z-axis directions. The acceleration sensor 38 may be of any type. The acceleration sensor 38 may, for example, be a piezoresistive type. Alternatively, the acceleration sensor 38 may be a capacitive type. The acceleration sensor 38 may also, for example, be a piezoelectric element (piezoelectric type) or thermal detection type of microelectromechanical system (MEMS). The acceleration sensor 38 may also, for example, be a servo-type of sensor that moves a moveable coil and returns the coil by feedback current. Furthermore, the acceleration sensor 38 may be a strain-gauge type of sensor that uses a strain gauge to measure strain generated by acceleration.

The gyro sensor 39 detects the angular velocity of the movement detection apparatus 2. The gyro sensor 39 is, for example, a three-axis vibration gyro sensor that detects the angular velocity from deformation of a structure due to the Coriolis force acting on a vibrated arm. This structure may, for example, be made of a piezoelectric material such as crystal or piezoelectric ceramic. The gyro sensor 39 may also be formed by MEMS technology using silicon material or the like for the structure. Furthermore, the gyro sensor 39 may be an optical gyro sensor. The controller 31 can measure the orientation of the movement detection apparatus 2 by integrating the angular velocity, acquired by the gyro sensor 39, over time once.

The barometric pressure sensor 40 detects the barometric pressure (atmospheric pressure) outside of the movement detection apparatus 2. The barometric pressure sensor 40 is, for example, a resistance change type of sensor that converts the change in barometric pressure to a resistance value. The barometric pressure sensor 40 may, for example, be a capacitance type of sensor that converts the change in barometric pressure to an electrostatic charge. The barometric pressure sensor 40 may also, for example, be a crystal oscillation frequency type sensor that converts the change in pressure to an oscillation frequency. In this embodiment, the barometric pressure sensor 40 has a resolution allowing detection of the change in barometric pressure over a height of several centimeters.

The controller 31 is a processor such as a central processing unit (CPU). The controller 31 may be a system-on-a-chip (SoC) or other type of integrated circuit in which other components are integrated. The controller 31 may be configured by combining a plurality of integrated circuits. The controller 31 implements a variety of functions by comprehensively controlling operations of the movement detection apparatus 2. In greater detail, the controller 31 refers as necessary to data stored in the storage 36. The controller 31 implements a variety of functions by executing instructions included in programs stored in the storage 36 to control other functional components, such as the communication interface 37.

The geomagnetic sensor 41 detects the orientation of the earth's magnetism. For example, the component when the orientation of the movement detection apparatus 2 is projected onto a plane parallel to the ground is the orientation information acquired by the geomagnetic sensor 41. The orientation information acquired by the geomagnetic sensor 41 is the direction of the movement detection apparatus 2.

The speaker 42 outputs sound. For example, the other person's voice during a hands-free call or the content of an e-mail that is read aloud is output as sound from the speaker 42.

The timer 32, camera 33, display 34, and microphone 35 are respectively the same as the timer 12, camera 13, display 14, and microphone 15 of the electronic device 1.

(Operations of Electronic Device)

Figure 3:
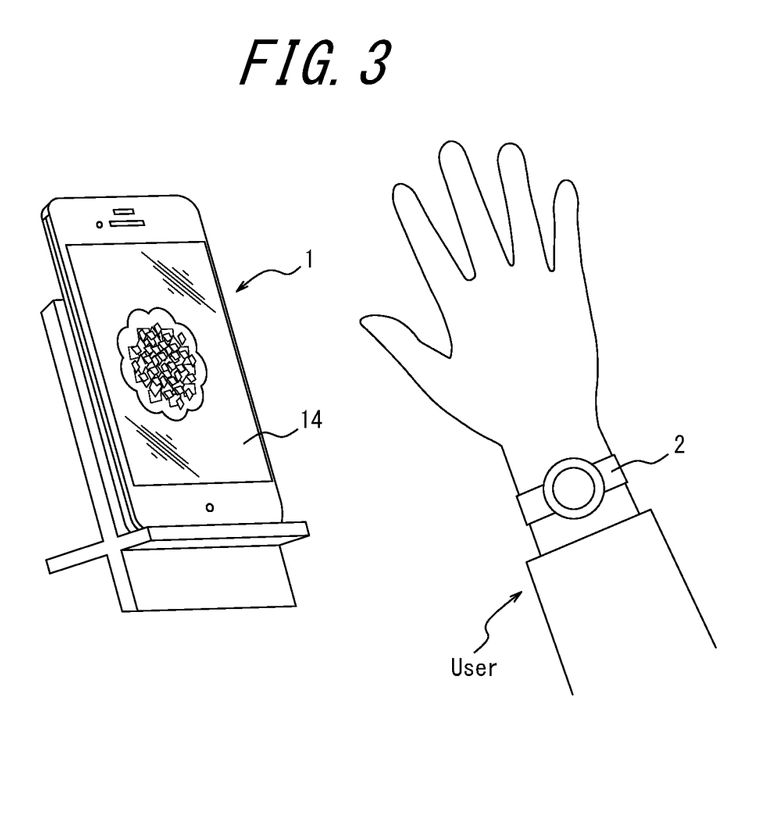
FIG. 3 illustrates the user operating an electronic device with a gesture.

FIG. 3 illustrates a user wearing the movement detection apparatus 2 on an arm and operating the electronic device 1 by moving the arm. In the example in FIG. 3, the electronic device 1 is supported by a stand. Alternatively, the electronic device 1 may be leaned against a wall or placed on a table. The movement detection apparatus 2 detects movement by the user and outputs the detected data to the electronic device 1. The controller 11 of the electronic device 1 executes processing in response to a user movement determined from the received detected data. Processing in response to the user movement may be processing such as scrolling the screen displayed on the display 14, expanding or contracting the screen displayed on the display 14, or the like. In this embodiment, the movement detection apparatus 2 is independent from the electronic device 1, detects movement by the user, and outputs the detected data to the electronic device 1. Therefore, as compared to when using a proximity sensor mounted in the electronic device 1, the electronic device 1 can be operated by a gesture from a more distant location.

The electronic device 1 in FIG. 3 is a smartphone. Alternatively, the electronic device 1 may, for example, be a mobile phone, a phablet, a tablet, a feature phone, or other such device. The electronic device 1 is not limited to these examples and may also be a personal digital assistant (PDA), a remote control, a portable music player, a game device, an electronic book reader, a car navigation device, a household appliance, an industrial device (factory automation (FA) device), or the like.

The movement detection apparatus 2 illustrated in FIG. 3 is a wristwatch-type wearable terminal (wearable device). The movement detection apparatus 2 is a wristwatch-type wearable terminal that can be worn on an arm in this embodiment, but the movement detection apparatus 2 is not limited to this example. Alternatively, the movement detection apparatus 2 may be a ring-type wearable terminal that can be worn on a finger or an eyeglasses-type wearable terminal that can be worn on the face. The movement detection apparatus 2 may also, for example, be a pen-shaped device that the user can grasp.

Figure 4:
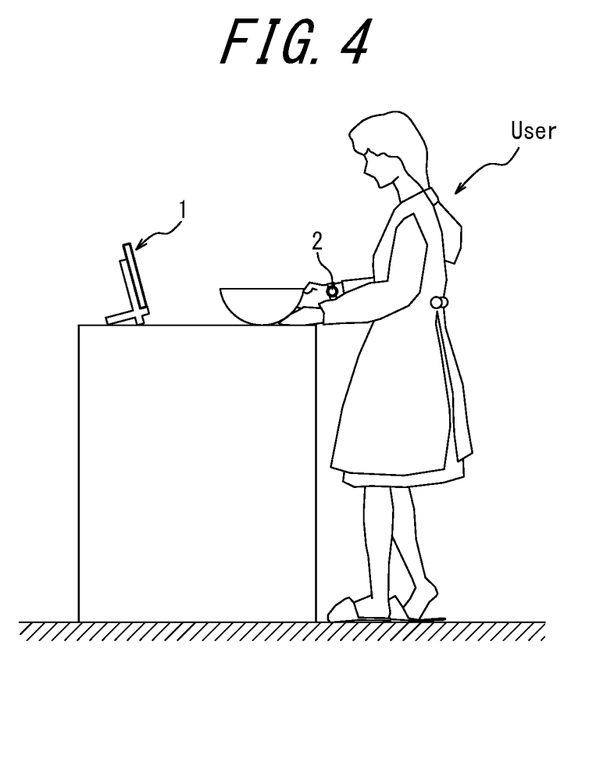
FIG. 4 illustrates an example of circumstances in which the user operates an electronic device with a gesture.

FIG. 4 illustrates an example of circumstances in which the user operates the electronic device 1 with a gesture. In the example in FIG. 4, the user is cooking in the kitchen by following a cooking recipe (written procedure) displayed on the display 14 of the electronic device 1. Here, for example, the screen displayed on the display 14 may be scrolled upward in conjunction with a gesture by which the user moves a hand upward in the longitudinal direction of the display 14. It is inconvenient for the user, however, if various movements during cooking (such as lifting a bowl) mistakenly scroll the recipe beyond the user's current state of progress. To increase usability, the electronic device 1 and movement detection apparatus 2 of this embodiment therefore execute the following processing, described with reference to FIGS. 5 and 6, in conjunction.

(Processing on Electronic Device Side)

The electronic device 1 has a plurality of modes. Modes refer to operation modes (operation states, operation statuses) that, for example, place restrictions on the operations of the entire electronic device 1. Only one mode can be selected at a time. The electronic device 1 has a first mode and a second mode. In this embodiment, the second mode is an operation mode (kitchen mode) of the electronic device 1 optimal for cooking in the kitchen while displaying a recipe. The recipe is an example of procedural information describing the procedure for performing predetermined operations during cooking (for example, cutting ingredients, mixing, and so forth). By contrast, the first mode is a regular operation mode (regular mode) appropriate for use for example in rooms other than the kitchen or outside of the home. The electronic device 1 is set to the first mode at startup.

Figure 5:
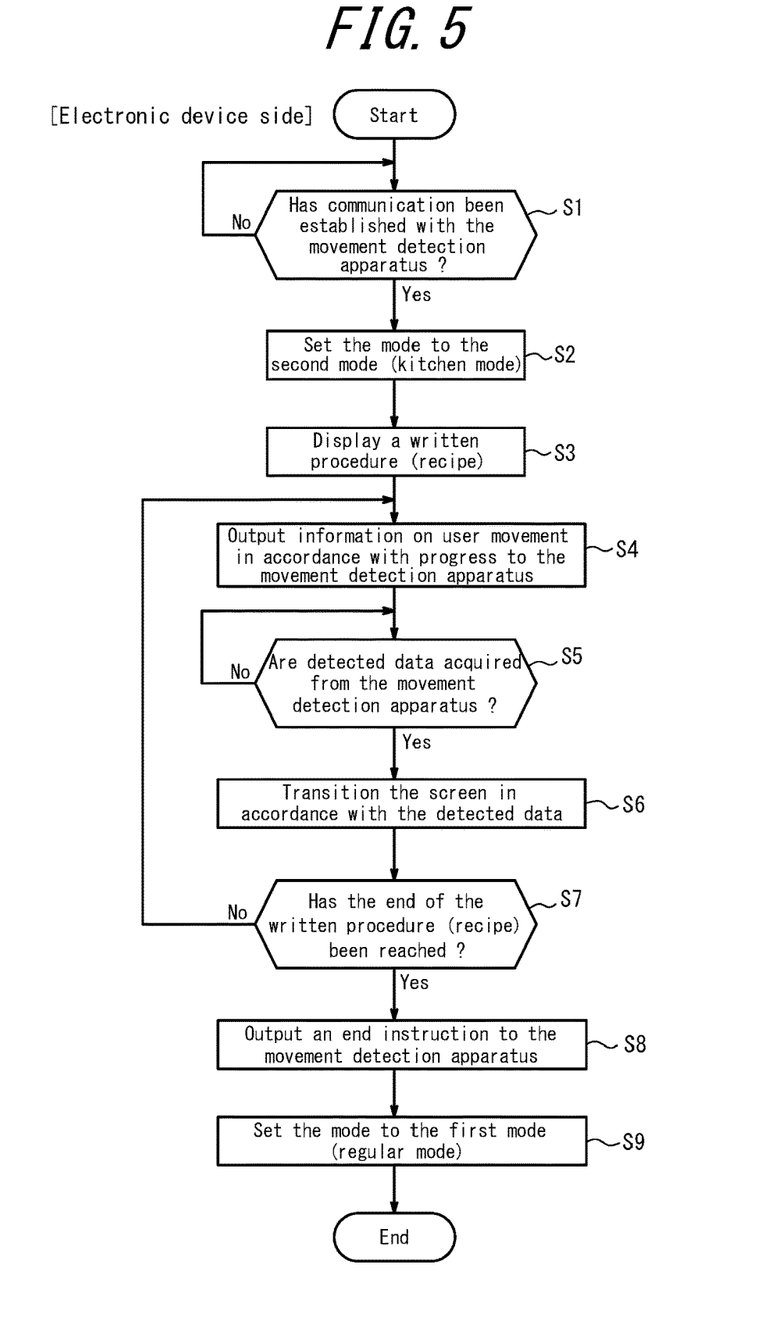
FIG. 5 is a flowchart illustrating an example of processing that is related to a written procedure and is executed by an electronic device according to an embodiment.

FIG. 5 is a flowchart illustrating an example of recipe display processing executed by the electronic device 1. First, the controller 11 establishes communication with the movement detection apparatus 2. The controller 11 stands by until successfully pairing with the movement detection apparatus 2 (step S1: No). Upon pairing with the movement detection apparatus 2, the controller 11 proceeds to the processing in step S2 (step S1: Yes).

Once pairing with the movement detection apparatus 2 is complete, the controller 11 sets the mode to the second mode, i.e. the kitchen mode (step S2). The processing in step S2 may be executed before step S1.

The controller 11 then causes the display 14 to display a recipe selected by the user (step S3).

The controller 11 outputs information on user movement in accordance with the state of progress of cooking to the movement detection apparatus 2 (step S4). The information on user movement indicates the user's next movement during cooking and includes, for example, movement in the x-axis and y-axis directions, rotational movement, movement in the z-axis direction, and the like. For example, suppose that in the current state of progress of cooking, ingredients are mixed next. At this time, the controller 11 outputs "rotational movement" as the information on user movement to the movement detection apparatus 2. The controller 11 can treat the content of the recipe displayed on the display 14 as the state of progress of cooking. When the recipe displayed on the display 14 suggests the next movement (an example of being related to movement), the controller 11 outputs information on a user movement to the movement detection apparatus 2. Here, the z-axis direction is the direction of height, and the x-axis and y-axis directions are in a horizontal plane perpendicular to the z-axis.

The controller 11 stands by until acquiring detected data from the movement detection apparatus 2 (step S5: No). Upon acquiring the detected data from the movement detection apparatus 2 (step S5: Yes), the controller 11 transitions the screen displayed on the display 14 in accordance with the detected data. Here, the detected data are from detection of a movement that corresponds to the information on user movement that the controller 11 output previously to the movement detection apparatus 2. By acquiring the detected data from the movement detection apparatus 2, the controller 11 can recognize that the user's state of cooking has progressed to the next stage of the recipe. The controller 11 can then advance the content of the recipe displayed on the display 14 to the next stage to show the user content that is appropriate for the state of cooking. Even if the user does not advance the content of the recipe by touching a touchscreen, for example, the controller 11 can recognize the state of progress of cooking and automatically scroll the recipe. The controller 11 may update the screen displayed on the display 14 upon detecting that the user has completed a predetermined movement. The controller 11 may also update the screen displayed on the display 14 upon detecting that the user has started a predetermined movement.

The controller 11 determines whether the content displayed on the display 14 is the end of the recipe, i.e. whether cooking is complete (step S7). When determining, from the detected data, that the last user movement in the recipe is complete (step S7: Yes), the controller 11 proceeds to the processing in step S8. When determining that the end of the recipe has not been reached (step S7: No), the controller 11 returns to the processing in step S4.

When determining that the end of the recipe has been reached, the controller 11 outputs an end instruction to the movement detection apparatus 2 (step S8). The controller 11 then sets the mode to the first mode, i.e. the regular mode (step S9).

(Processing on Movement Detection Apparatus Side)

Figure 6:
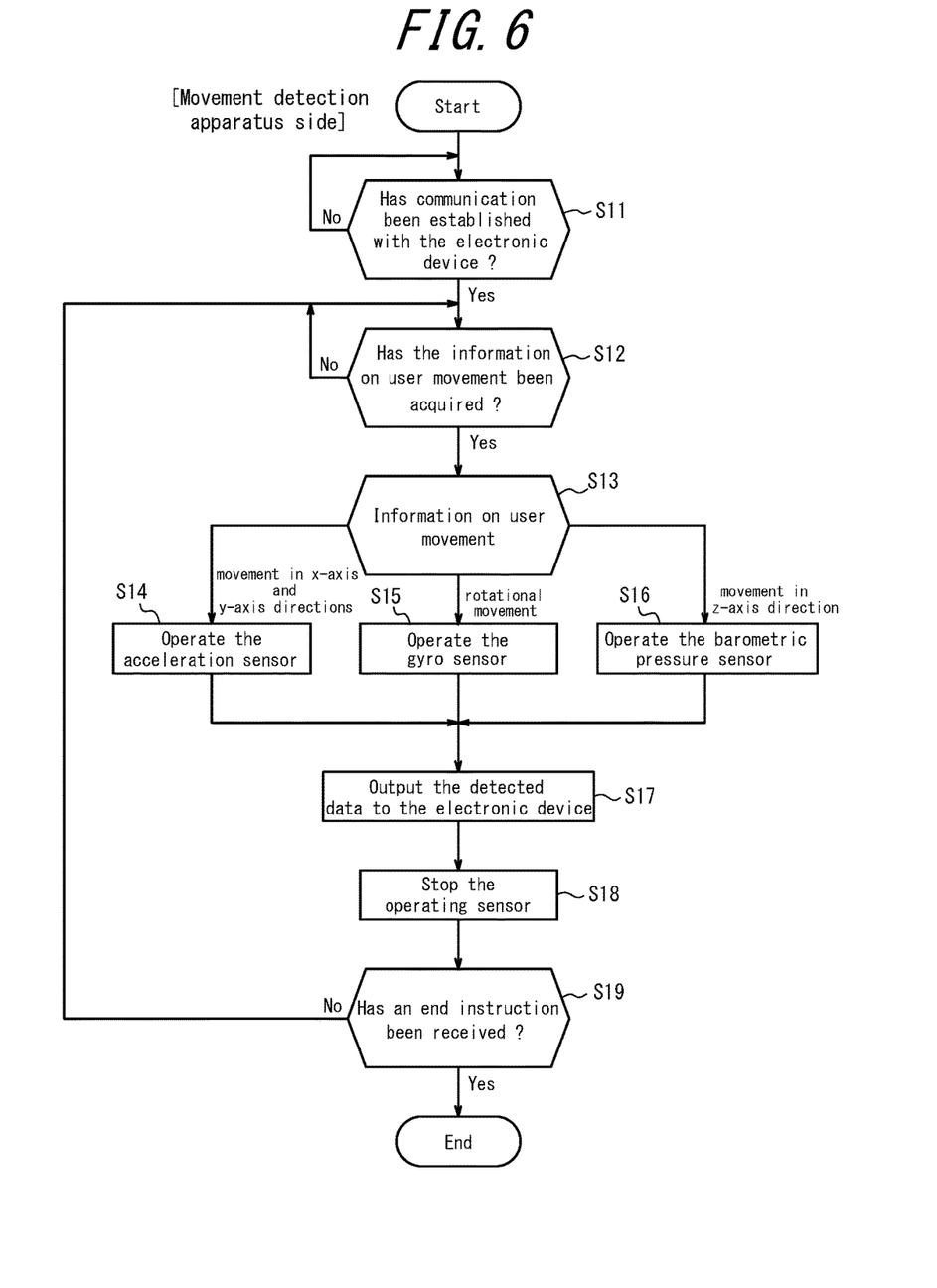
FIG. 6 is a flowchart illustrating an example of processing that is related to a written procedure and is executed by the movement detection apparatus that communicates with the electronic device.

FIG. 6 is a flowchart illustrating an example of user movement detection processing executed by the movement detection apparatus 2. The movement detection apparatus 2 executes the following processing in conjunction with the recipe display processing (FIG. 5) executed by the electronic device 1.

First, the controller 31 of the movement detection apparatus 2 stands by until communication is established with the electronic device 1 (step S11: No). Once communication is established with the electronic device 1, the controller 31 proceeds to the processing in step S12 (step S11: Yes).

The controller 31 stands by until acquiring information on user movement from the electronic device 1 (step S12: No). Upon acquiring information on user movement (step S12: Yes), the controller 31 determines the type of movement the user performs next during cooking (step S13). In this embodiment, the controller 31 determines whether the information on user movement is movement in the x-axis and y-axis directions, rotational movement, or movement in the z-axis direction.

When the information on the user movement indicates movement in the x-axis and y-axis directions, the controller 31 causes the acceleration sensor 38 to operate to detect motion by the user to the left, right, front, and back (step S14). The motion by the user to the left, right, front, and back can be recognized from the value of the acceleration composite vector, with components along the x-axis and the y-axis, detected by the acceleration sensor 38.

When the information on the user's movement indicates a rotational movement, the controller 31 causes the gyro sensor 39 to operate to detect the user's motion to rotate the arm or the like (step S15). The motion related to rotation by the user can be recognized from the value of the angular velocity, around the x, y, and z-axes, detected by the gyro sensor 39.

When the information on the user movement indicates movement in the z-axis direction, the controller 31 causes the barometric pressure sensor 40 to operate to detect vertical movement of the user's hand or the like (step S16). Vertical movement by the user can be recognized from the change in barometric pressure detected by the barometric pressure sensor 40.

Here, motion in the z-axis direction can also be detected by the acceleration sensor 38, but the user's motion in the height direction can be clearly isolated by detecting motion in the z-axis direction with the barometric pressure sensor 40 separately from motion in the x-axis and y-axis directions. Therefore, the motion can be recognized more accurately. Furthermore, two or more of the acceleration sensor 38, gyro sensor 39, and barometric pressure sensor 40 may be caused to operate simultaneously. For example, when the information on the user movement includes both movement in the x-axis and y-axis directions and movement in the z-axis direction, the controller 31 causes the acceleration sensor 38 and the barometric pressure sensor 40 to operate.

The controller 31 outputs the value detected by the operating sensor (detected data) to the electronic device 1 (step S17). The controller 31 then stops the operating sensor (step S18).

The controller 31 ends the sequence of processing if an end instruction is received from the electronic device 1 (step S19: Yes). The controller 31 returns to the processing in step S12 if no end instruction is received from the electronic device 1 (step S19: No).

As described above, the electronic device 1 uses the communication interface 17 to communicate with the movement detection apparatus 2, which includes a motion sensor (in this embodiment, the acceleration sensor 38, gyro sensor 39, and barometric pressure sensor 40) that detects a predetermined movement (for example, cutting ingredients, mixing, and so forth) by the user. The controller 11 of the electronic device 1 activates the motion sensor when a screen (a recipe in this embodiment) displayed on the display 14 is related to a predetermined movement of the user. Also, when the motion sensor detects the start or the end of a predetermined movement, the controller 11 updates the screen (a recipe in this embodiment) displayed on the display 14. As compared to an electronic device that uses a proximity sensor, the electronic device 1 can be operated by a gesture (to transition the display of a recipe) from a more distant location. The electronic device 1 can thus be made more convenient.

In this embodiment, the predetermined movement by the user includes a plurality of motions (motions to the left, right, front, and back, motions to rotate the arm or the like, and vertical motions of a hand or the like). The motion sensor includes a plurality of sensors (acceleration sensor 38, gyro sensor 39, and barometric pressure sensor 40) that detect this plurality of motions. When a recipe displayed on the display 14 is related to a certain motion (for example, a motion to rotate the arm or the like), the controller 11 activates a sensor (for example, the gyro sensor 39) that detects the certain motion. Accordingly, the recipe is not erroneously scrolled to a position beyond the current state of progress by a movement (such as moving a bowl) other than the user movement expected for the recipe of the food being prepared. In other words, the electronic device 1 can display an appropriate recipe for the user. The power consumption of the movement detection apparatus 2 can also be reduced, since only the necessary sensor is caused to operate in accordance with progress of the recipe. For example, the barometric pressure sensor 40 typically has a larger power consumption than the acceleration sensor 38. In this embodiment, the barometric pressure sensor 40 is only operated when necessary in accordance with progress of the recipe and is stopped after being caused to output the detected data. The power consumption of the movement detection apparatus 2 can therefore be reduced.

In this embodiment, the controller 31 of the movement detection apparatus 2 stops the operating sensor after transmission of the detected data. The controller 31, however, may cause the acceleration sensor 38 to continue to operate. The controller 11 may cause the acceleration sensor 38 to operate and then acquire the detected data in the regular mode (or in the kitchen mode by user instruction). At this time, in accordance with motion by the user to the left, right, front, and back, the controller 11 can adjust the screen displayed on the display 14. For example, the screen displayed on the display 14 may be scrolled upward upon the user performing a gesture to raise the hand in the longitudinal direction of the display 14. At this time, the controller 31 may cause the gyro sensor 39 to operate. The controller 11 may adjust the screen displayed on the display 14 in accordance with a rotational movement by the user. Furthermore, the controller 11 is not limited to adjusting the screen displayed on the display 14 and may also receive gesture operations for control of a variety of applications. For example, when the electronic device 1 is at a distance from the user who is wearing the movement detection apparatus 2 and an alarm of the electronic device 1 goes off, the user can turn off the alarm with a gesture. The user who is wearing the movement detection apparatus 2 can also be allowed to place a hands-free call or check e-mail (by display or reading aloud) with a gesture.

Embodiment 2

An electronic device 1 according to Embodiment 2 is described below with reference to FIGS. 7 and 8. In this embodiment, with the processing described below, user operations can be detected even more accurately than in Embodiment 1. Since the configuration of the electronic device 1 and the movement detection apparatus 2 are the same as in Embodiment 1, a description thereof is omitted. Furthermore, as in Embodiment 1, the electronic device 1 is used when the user is cooking in the kitchen. Among movements performed while following the recipe, this example focuses on mixing, describing this movement in detail while omitting details on other movements.

(Processing on Electronic Device Side)

Figure 7:
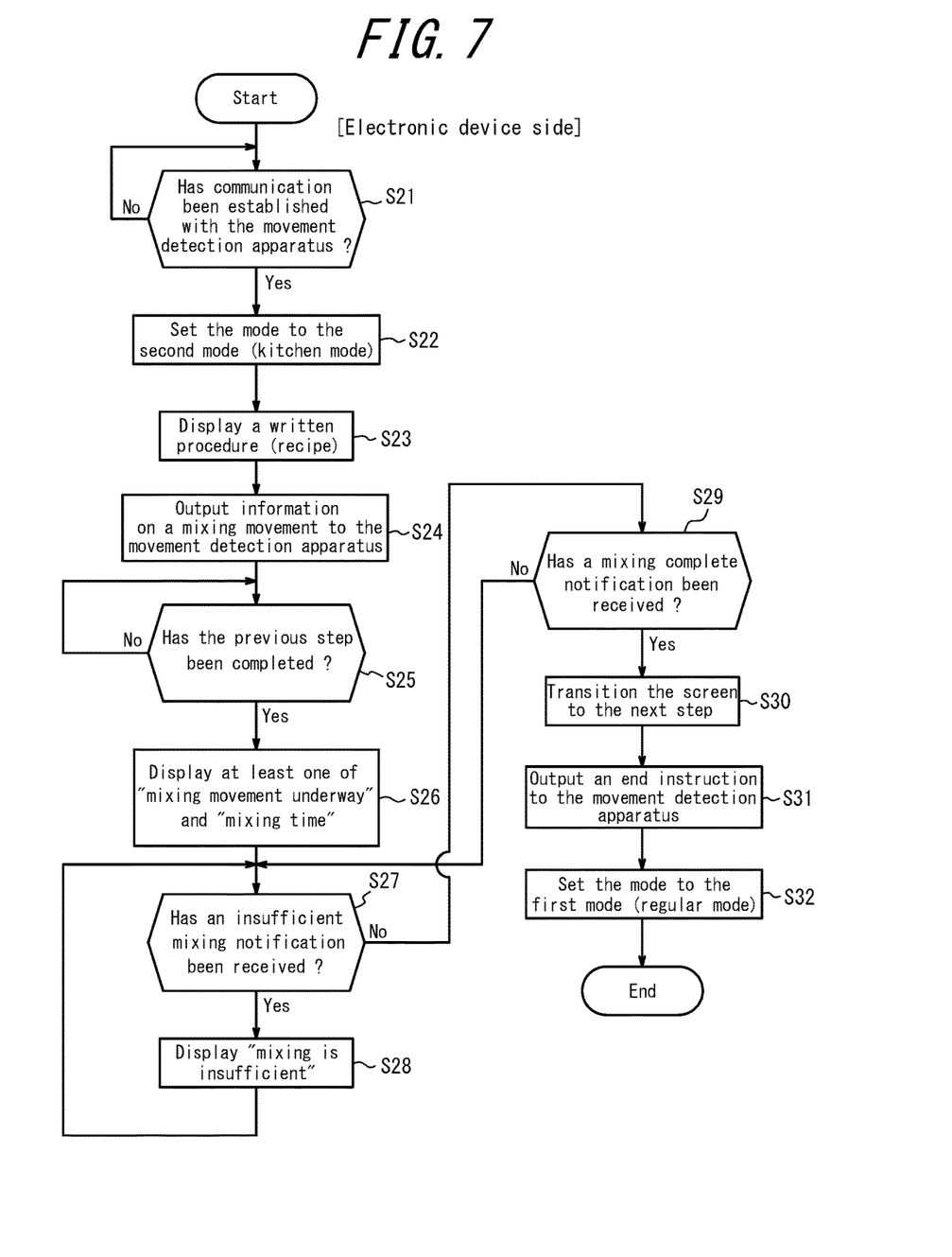
FIG. 7 is a flowchart illustrating another example of processing that is related to a written procedure and is executed by an electronic device according to an embodiment.

FIG. 7 is a flowchart illustrating an example of recipe display processing executed by the electronic device 1. First, the controller 11 establishes communication with the movement detection apparatus 2. The controller 11 stands by until successfully pairing with the movement detection apparatus 2 (step S21: No). Upon pairing with the movement detection apparatus 2, the controller 11 proceeds to the processing in step S22 (step S21: Yes).

Once pairing with the movement detection apparatus 2 is complete, the controller 11 sets the mode to the second mode, i.e. the kitchen mode (step S22).

The controller 11 then causes the display 14 to display a recipe selected by the user (step S23).

The controller 11 outputs information on a mixing movement to the movement detection apparatus 2 (step S24). The mixing movement includes a rotational movement that can be recognized from the value of the angular velocity, around the x, y, and z-axes, detected by the gyro sensor 39 of the movement detection apparatus 2.

The controller 11 stands by until the step before mixing (for example, cutting ingredients) is completed (step S25: No). Once the step before mixing is completed (step S25: Yes), the controller 11 then executes the processing of step S26.

As described below, the movement detection apparatus 2 determines whether the mixing movement is sufficient. The movement detection apparatus 2 also manages the mixing time. On the basis of an insufficient mixing notification and a mixing complete notification received from the movement detection apparatus 2, the controller 11 can notify the user of the status of the mixing movement (for example, by displaying that mixing is insufficient on the display 14).

The controller 11 causes the display 14 to display at least one of "mixing movement underway" and "mixing time" (step S26).

The controller 11 determines whether an insufficient mixing notification has been received from the movement detection apparatus 2 (step S27). When an insufficient mixing notification has been received (step S27: Yes), the controller 11 causes the display 14 to display that "mixing is insufficient" (step S28). The controller 11 then returns to the processing in step S27.

Conversely, when an insufficient mixing notification has not been received (step S27: No), the controller 11 determines whether a mixing complete notification has been received from the movement detection apparatus 2 (step S29). When a mixing complete notification has been received (step S29: Yes), the controller 11 proceeds to the processing in step S.B. When a mixing complete notification has not been received (step S29: No), the controller 11 returns to the processing in step S27.

When a mixing complete notification has been received, the controller 11 transitions the screen displayed on the display 14. In other words, the controller 11 scrolls the screen displayed on the display 14 to the next step of the recipe (step S30).

Subsequently, the controller 11 outputs an end instruction to the movement detection apparatus 2 (step S31). The controller 11 then sets the mode to the first mode, i.e. the regular mode (step S9).

(Processing on Movement Detection Apparatus Side)

Figure 8:
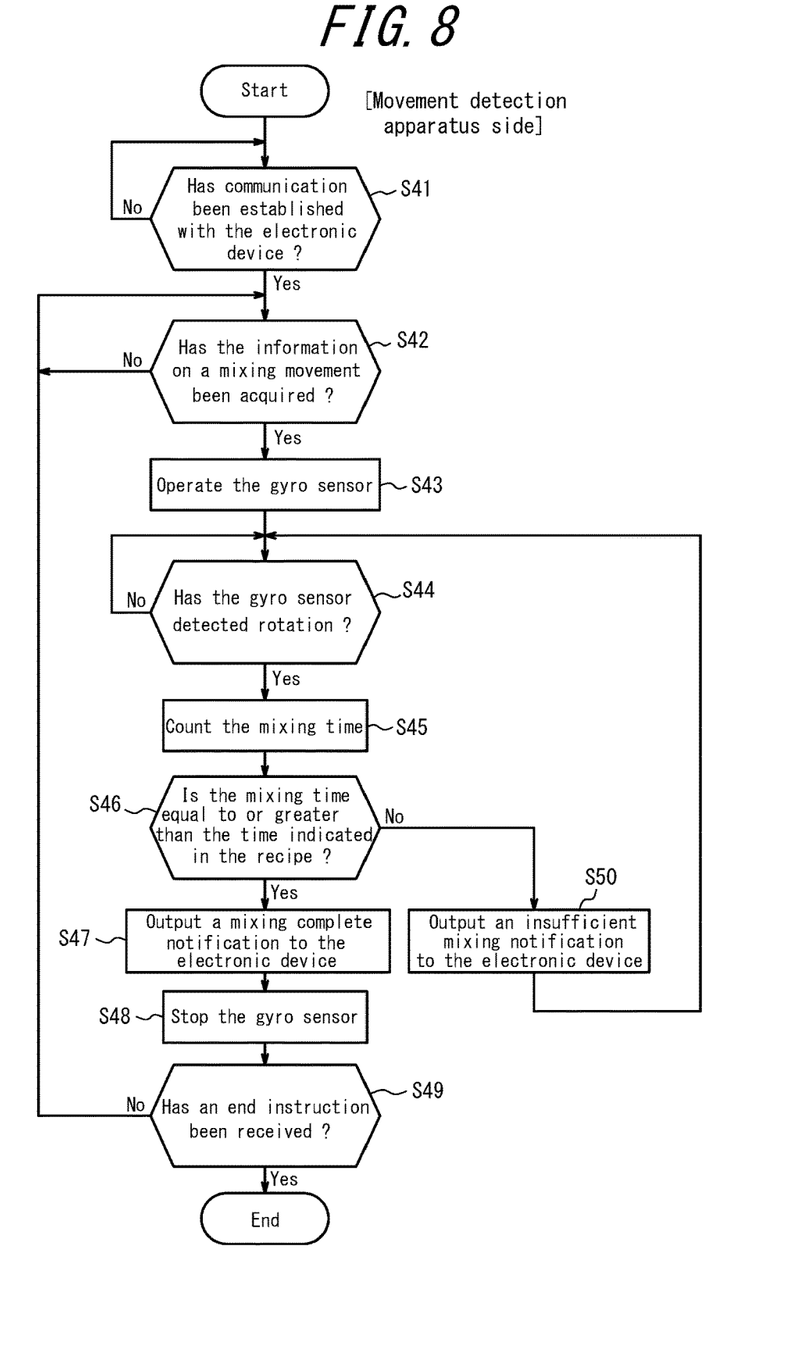
FIG. 8 is a flowchart illustrating another example of processing that is related to a written procedure and is executed by the movement detection apparatus that communicates with the electronic device.

FIG. 8 is a flowchart illustrating an example of user movement detection processing executed by the movement detection apparatus 2. The movement detection apparatus 2 executes the following processing in conjunction with the recipe display processing (FIG. 7) executed by the electronic device 1.

First, the controller 31 of the movement detection apparatus 2 stands by until communication is established with the electronic device 1 (step S41: No). Once communication is established with the electronic device 1, the controller 31 proceeds to the processing in step S42 (step S41: Yes).

The controller 31 stands by until acquiring information on a mixing movement from the electronic device 1 (step S42: No). Upon acquiring information on a mixing movement (step S42: Yes), the controller 31 causes the gyro sensor 39 to operate to detect the user's motion to rotate the arm or the like (step S43). In this embodiment, information on a mixing movement includes the mixing time (such as one minute) indicated in the recipe.

The controller 31 stands by until detecting rotation with the gyro sensor 39 (step S44: No). Upon detecting rotation with the gyro sensor 39 (step S44: Yes), the controller 31 proceeds to the processing in step S45.

The controller 31 counts the time the user has spent mixing from the detected data of the gyro sensor 39 (step S45). In other words, the controller 31 counts how long the user has performed the mixing movement.

The controller 31 determines whether the time the user has spent mixing is equal to or greater than the time indicated in the recipe (step S46). If the time the user has spent mixing is equal to or greater than the time indicated in the recipe (step S46: Yes), then the controller 31 outputs a mixing complete notification to the electronic device 1 (step S47). The controller 31 then stops the gyro sensor 39 (step S48). Since insufficient mixing causes problems in the recipe in this example, it suffices for the mixing time to be equal to or greater than the time indicated in the recipe. If overmixing also causes problems in the recipe, however, it suffices to determine in step S46 whether the mixing time has been reached.

The controller 31 ends the sequence of processing if an end instruction is received from the electronic device 1 (step S49: Yes). The controller 31 returns to the processing in step S42 if no end instruction is received from the electronic device 1 (step S49: No).

Conversely, when determining in step S46 that the mixing time is less than the time indicated in the recipe (step S46: No), the controller 31 outputs an insufficient mixing notification to the electronic device 1 (step S50). The controller 31 then returns to the processing in step S44.

As described above, as compared to an electronic device that uses a proximity sensor, the electronic device 1 can be operated by a gesture (to transition the display of a recipe) from a more distant location in this embodiment as well. The electronic device 1 can thus be made more convenient, as in Embodiment 1.

Furthermore, in this embodiment, the movement detection apparatus 2 worn by the user determines whether the time the user spends mixing is equal to or greater than the time indicated in the recipe. For example, the movement detection apparatus 2 can also easily recognize that the user is taking a break. By accurately measuring the actual mixing time, the movement detection apparatus 2 can detect movement by the user more accurately than in Embodiment 1.

In this embodiment, the electronic device 1 receives an insufficient mixing notification and a mixing complete notification from the movement detection apparatus 2. For example, the electronic device 1 does not need to calculate the remaining mixing time from the detected data. Hence, as compared to Embodiment 1, the processing load of the electronic device 1 can be reduced. Here, the electronic device 1 may determine that mixing is incomplete until receiving a mixing complete notification. At this time, the movement detection apparatus 2 can omit the insufficient mixing notification.

Other Embodiments

This disclosure is based on the drawings and on embodiments, but it should be noted that a person of ordinary skill in the art could easily make a variety of modifications and adjustments based on this disclosure. Therefore, such changes and modifications are to be understood as included within the scope of this disclosure. For example, the functions and the like included in the various components and steps may be reordered in any logically consistent way. Furthermore, components or steps may be combined into one or divided.

In some of the above embodiments, the controller 11 switches the mode. The mode may, however, be set manually by the user. The user may, for example, set the first mode or the second mode on a setting screen. The mode may also be settable from a notification (notification screen) that appears upon, for example, swiping the edge of the screen. When notifications can be used, the user can quickly and easily change modes without going through multiple layers of setting screens.

In Embodiment 1, the controller 11 recognizes the state of progress of cooking with reference to the detected data from the movement detection apparatus 2 and automatically scrolls the recipe. When determining that the detected data from the movement detection apparatus 2 do not match the content of the recipe, the controller 11 may cause the display 14 to display at least one of an image and characters warning that the cooking step differs. For example, suppose that the gyro sensor 39 is operating during the mixing step, and the acceleration sensor 38 is also operating as a result of user instruction or the like. At this time, when the controller 11 only acquires detected data from the acceleration sensor 38 for some time, the controller 11 may cause the display 14 to display a message prompting the user to perform a mixing movement.

In the example in Embodiment 2, the gyro sensor 39 operates, and the controller 31 determines completion of the cooking step of mixing ingredients. As another example, the acceleration sensor 38 may operate, and the controller 31 may determine completion of the cooking step of cutting ingredients. For example, in accordance with data indicating vibration detected by the acceleration sensor 38, the controller 31 can recognize the state of progress of a cutting operation. Here, the controller 31 can determine that the vibration detected by the acceleration sensor 38 is caused by the user walking when the amplitude of the vibration is large and is caused by a cutting operation otherwise. The controller 31 can also determine the cutting proficiency and provide the user with advice on the basis of the acceleration cycle and the stability of the cycle. The controller 31 may also determine how thinly the user is cutting by referring to the number of vibrations and the required time.

Much of the subject matter of the present disclosure is described as a series of operations executed by a computer system and other hardware that can execute program instructions. Examples of the computer system and other hardware include a general-purpose computer, a personal computer (PC), a dedicated computer, a workstation, a personal communications system (PCS), a mobile (cellular) phone, a mobile phone with a data processing function, a radio-frequency identification (RFID) receiver, a game device, an electronic notepad, a laptop computer, a global positioning system (GPS) receiver, and other programmable data processing apparatuses. It should be noted that in each embodiment, various operations and control methods are executed by a dedicated circuit (for example, individual logical gates interconnected in order to execute a particular function) implementing program instructions (software), or by a logical block, program module, or the like executed by one or more processors. The one or more processors that execute a logical block, program module, or the like include, for example, one or more of a microprocessor, CPU, application specific integrated circuit (ASIC), digital signal processor (DSP), programmable logic device (PLD), field programmable gate array (FPGA), processor, controller, microcontroller, microprocessor, electronic device, other apparatus designed to be capable of executing the functions disclosed here, and/or a combination of any of the above. The embodiments disclosed here are, for example, implemented by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment may transmit and/or receive information, data arguments, variables, or memory content to or from another code segment or hardware circuit in order for the code segment to connect to another code segment or hardware circuit.

The storage 16 used here may also be configured as a computer-readable, tangible carrier (medium) in the categories of solid-state memory, magnetic disks, and optical discs. Data structures and an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic or optical storage medium, such as a compact disc (CD), Laser Disc®, digital versatile disc (DVD®), Floppy® disk, and Blu-ray Disc® (laser disc, DVD, floppy, and Blu-ray disc are registered trademarks in Japan, other countries, or both). Further examples include a portable computer disk, random access memory (RAM), read-only memory (ROM), rewritable programmable ROM such as erasable programmable read-only memory (EPROM), electrically erasable programmable read-only memory (EEPROM), or flash memory, another tangible storage medium that can store information, or a combination of any of these. The memory may be provided internal and/or external to a processor or processing unit. As used in this disclosure, the term "memory" refers to all types of long-term storage, short-term storage, volatile, non-volatile, or other memory. In other words, the "memory" is not limited to a particular type or number. The type of medium on which information is stored is not limited, either.

The invention claimed is:

1. An electronic device comprising:
   a communication interface configured to communicate with a movement detection apparatus comprising a plurality of motion sensors, the plurality of motion sensors being configured to detect a predetermined movement comprising a plurality of motions of a user;
   a display; and
   a controller configured to activate one of the plurality of motion sensors when a procedure for performing operations displayed on the display is related to the predetermined movement, wherein
   when the procedure for performing operations displayed on the display is related to one motion associated with a next step in the procedure for performing operations from among the plurality of motions, the controller activates one of the motion sensors that detects the one motion.

2. An electronic device comprising:
   a communication interface configured to communicate with a movement detection apparatus comprising a plurality of motion sensors, the plurality of motion sensors being configured to detect a predetermined movement comprising a plurality of motions of a user;
   a display; and
   a controller configured to activate one of the plurality of motion sensors when a procedure for performing operations displayed on the display is related to the predetermined movement, and update a screen displayed on the display when the plurality of motion sensors detects a start or an end of the predetermined movement, wherein
   when the procedure for performing operations displayed on the display is related to one motion associated with a next step in the procedure for performing operations from among the plurality of motions, the controller activates one of the motion sensors that detects the one motion.

3. A non-transitory computer-readable recording medium including computer program instructions to be executed by an electronic device comprising a display and a communication interface configured to communicate with a movement detection apparatus comprising a plurality of motion sensors, the plurality of motion sensors being configured to detect a predetermined movement comprising a plurality of motions of a user, the instructions causing the electronic device to:
   activate one of the plurality of motion sensors when a procedure for performing operations displayed on the display is related to the predetermined movement, wherein
   when the procedure for performing operations displayed on the display is related to one motion associated with a next step in the procedure for performing operations from among the plurality of motions, the controller activates one of the motion sensors that detects the one motion.

4. A non-transitory computer-readable recording medium including computer program instructions to be executed by an electronic device comprising a display and a communication interface configured to communicate with a movement detection apparatus comprising a plurality of motion sensors, the plurality of motion sensors being configured to detect a predetermined movement comprising a plurality of motions of a user, the instructions causing the electronic device to:

activate one of the plurality of motion sensors when a procedure for performing operations displayed on the display is related to the predetermined movement, and update a screen displayed on the display when the plurality of motion sensors detects a start or an end of the predetermined movement, wherein when the procedure for performing operations displayed on the display is related to one motion associated with a next step in the procedure for performing operations from among the plurality of motions, the controller activates one of the motion sensors that detects the one motion.

5. A control method of an electronic device comprising a display and a communication interface configured to communicate with a movement detection apparatus comprising a plurality of motion sensors, the plurality of motion sensors being configured to detect a predetermined movement comprising a plurality of motions of a user, the control method comprising:

activating one of the plurality of motion sensors when a procedure for performing operations displayed on the display is related to the predetermined movement, wherein when the procedure for performing operations displayed on the display is related to one motion associated with a next step in the procedure for performing operations from among the plurality of motions, the controller activates one of the motion sensors that detects the one motion.

6. A control method of an electronic device comprising a display and a communication interface configured to communicate with a movement detection apparatus comprising a plurality of motion sensors, the plurality of motion sensors being configured to detect a predetermined movement comprising a plurality of motions of a user, the control method comprising:

activating one of the plurality of motion sensors when a procedure for performing operations displayed on the display is related to the predetermined movement, and updating a screen displayed on the display when the plurality of motion sensors detects a start or an end of the predetermined movement, wherein when the procedure for performing operations displayed on the display is related to one motion associated with a next step in the procedure for performing operations from among the plurality of motions, the controller activates one of the motion sensors that detects the one motion.

* * * * *